United States Patent [19]

Greenstein et al.

[11] Patent Number: 5,065,426
[45] Date of Patent: Nov. 12, 1991

[54] FACSIMILE/TELEPHONE CONTROLLER

[75] Inventors: Harvey Greenstein, Iselin; Charles B. Levinski, South River; Edward Newman, Bricktown; John M. Persel, Toms River; David N. Widmann, Manasquan, all of N.J.

[73] Assignee: Hecon Corporation, Eatontown, N.J.

[21] Appl. No.: 382,110

[22] Filed: Jul. 18, 1989

[51] Int. Cl.⁵ .......................................... H04M 11/00
[52] U.S. Cl. ........................................ 379/100; 379/93
[58] Field of Search ............... 379/100, 96, 97, 98, 379/95, 93, 114, 116, 144, 188, 200; 355/133, 201, 202

[56] References Cited

U.S. PATENT DOCUMENTS

| | | | |
|---|---|---|---|
| 3,594,495 | 7/1971 | Bond | 358/86 |
| 4,099,033 | 7/1978 | Murray | 379/188 |
| 4,232,200 | 11/1980 | Hestad et al. | 379/188 |
| 4,249,216 | 2/1981 | Kanda | 379/100 |
| 4,419,697 | 12/1983 | Wada | 379/100 |
| 4,432,020 | 2/1984 | Onose et al. | 379/100 |
| 4,524,393 | 7/1985 | Ohzeki | 358/436 |
| 4,532,554 | 7/1985 | Skala | 358/434 |
| 4,533,237 | 8/1985 | Stockburger et al. | 355/133 |
| 4,585,904 | 4/1986 | Mincone et al. | 379/112 |
| 4,646,160 | 2/1987 | Iizuka et al. | 379/100 |
| 4,750,201 | 6/1988 | Hodgson et al. | 379/144 |
| 4,754,335 | 6/1988 | Izawa et al. | 379/100 |
| 4,800,439 | 1/1989 | Yoshino | 379/100 |
| 4,813,065 | 3/1989 | Segala | 379/112 |
| 4,823,376 | 4/1989 | Takahashi | 379/100 |
| 4,837,813 | 6/1989 | Terajima | 379/113 |
| 4,860,347 | 8/1989 | Costello | 379/200 |
| 4,868,865 | 9/1989 | Ogawa et al. | 379/100 |
| 4,908,851 | 3/1990 | Kotani et al. | 379/96 |
| 4,924,495 | 5/1990 | Richards et al. | 379/127 |

Primary Examiner—Jin F. Ng
Assistant Examiner—Stella L. Woo
Attorney, Agent, or Firm—Louis Weinstein

[57] ABSTRACT

A microprocessor/based telephone/facsimile controller which automatically gives priority to incoming messages. The ring voltage of an incoming message causes the microprocessor to close and latch the line between the telephone and the facsimile. When transmission is completed, the line is dropped and this condition is sensed causing the latch relay to open to prevent the facsimile from transmitting, no data being logged for incoming facsimile transmissions. Only a valid input code permits the coupling of the facsimile to the telephone line also initiating a timer. A broadcast mode latches the telephone line to permit delayed calls and multiple facsimile transmissions, each allocated to the user code which established the broadcast mode. A default time is utilized to accommodate the redial and use of the line for non-facsimile telephone transmission.

51 Claims, 4 Drawing Sheets

FACSIMILE/TELEPHONE CONTROLLER

FIELD OF THE INVENTION

The present invention relates to controller devices, and more particularly, to a novel controller device for a facsimile/telephone system for limiting use of the system to qualified personnel and further yielding priority to incoming messages and for allocating all transmissions to the proper accounts.

It is conventional in the art to provide equipment such as accountability controllers for limiting access to office operating equipment to only qualified personnel. For example, it is conventional to provide accountability for copier machines by providing a controller which is interfaced with the copier and which includes a key pad for entering an access code known only to qualified personnel. The controller examines the access code entered and, if valid, enables the copier to produce copies. The controller typically maintains a count of the number of copies and allocates this count to the access number which is entered or to the department in which the user having that access number is assigned, or both, for example.

It is highly desirable to provide similar capabilities for facsimile/telephone equipment. However, there are a number of conditions which are unique to facsimile/telephone equipment that must be confronted in order to provide similar accountability for facsimile/telephone equipment. For example, although it is desired to provide accountability for outgoing telephone and/or facsimile transmissions, the facsimile/telephone equipment must nevertheless be free to receive and accept an incoming message and, in fact, it is preferred that such incoming messages be given priority in situations where an incoming message and an attempt to transmit wish to seize the line at substantially the same time. The controller must also be able to differentiate between a facsimile transmission and a conventional telephone call. In addition, the controller must be able to accommodate redialing and broadcasting or time delay transmissions. Heretofore, no accommodation has been made for a resolution of these problems since they did not exist prior to the advent of facsimile/telephone equipment.

BRIEF DESCRIPTION OF THE INVENTION

The present invention is characterized by comprising an electronic apparatus and method for controlling the use of facsimile/telephone equipment in the transmission mode in which accountability of the equipment is monitored and is allocated to either a department or an individual user which accountability is obtained without interference with incoming messages.

The present invention is characterized by comprising a controller including microprocessor means and telephone line interface circuitry. The microprocessor system includes a microprocessor, random access memory (RAM), a read-only memory (EPROM), a real time clock, a keyboard, a display and a serial printer port. Operating software is stored in the EPROM and the microprocessor controls the functions of both the microprocessor system and the telephone interface circuitry. Data is stored in the RAM, commands are entered by way of the keyboard and the user reads human interface information from the display. The clock records the time, date and duration of facsimile use in the RAM. The serial port provides for a hard copy output by way of a printer or alternatively provides for networking with other controllers or computers for future implementations.

The telephone line interface includes means for sensing the presence of a ring voltage of an incoming message for closing latching means which connects the phone line to the facsimile machine. The facsimile machine picks up the telephone line causing line sensing means to close and signal the microprocessor that the line is in use and that the latching means should be retained in the closed condition. Upon completion of the incoming facsimile message, the facsimile machine drops the line causing the line sensing means to open. This condition is conveyed to the microprocessor causing the latching means to be opened thereby preventing transmission of facsimile messages. No data is logged for incoming facsimile messages.

When a facsimile message is to be transmitted, the user enters an account number and an optional department number, for example. If these numbers match valid authorized numbers in memory, the latch means is closed, enabling a facsimile to be sent over the telephone line. The sensing means senses that the line has been picked up and initiates an internal timer. As numbers are dialed by the facsimile machine, the sensing means detects each number which is then stored in RAM as part of the transaction record. When the facsimile machine being called answers, it generates a 2100 Hz. tone. A 2100 Hz. detector senses the tone, sets the facsimile flag causing the microprocessor to record the account and department number, the time and date and reset the internal timer to zero. The timer then times the duration of the facsimile message which is also displayed by the display means.

When the facsimile communication is completed, the facsimile machine drops the line, causing the timer to stop, the duration of the transmission to be recorded and the latching means to be opened in readiness for the next facsimile transmission or reception.

In the event that the facsimile/telephone machine is utilized to place a non-facsimile phone call, a "default time" is set by the user upon installation of the system, which default time is set to be slightly longer than the "attempt time" for the facsimile machine, which is defined as a period which the facsimile machine will continue to hold the line if there is no answer at the facsimile machine being called. When the line sense relay detects that the phone is picked up, the internal timer begins timing. If this time exceeds the default time and the line remains picked-up, the call will be logged as a telephone call rather than a facsimile transmission even though no 2100 Hz. signal was detected. This capability prevents unauthorized calls to non-facsimile telephone numbers and further assures logging of all phone line usage.

In situations where the receiving facsimile machine does not have a dedicated line, the time required for the facsimile transmission will usually exceed the default time, causing the transaction to be logged as a telephone call. However, when the facsimile machine being called answers by generating a 2100 Hz. tone, the microprocessor changes the flag to reflect a facsimile communication.

In applications where the facsimile machine being called is busy or does not answer, the transmitting facsimile machine will attempt to complete the connection for the "attempt time" and thereafter will enter into an automatic redial mode and will drop the line and try the call at a later time. As long as the controller default time is not exceeded, the controller will also enter into "redial standby" mode upon release of the telephone line, keeping the latching means closed. If the same telephone number is dialed by the facsimile machine after entering "redial standby" as was dialed before entering "redial standby", the call will be treated as a standard transmission and will be charged to the account number and department originally entered. When the facsimile transmission is established, the controller returns to its standard "idle" mode. If the number is busy or there is no answer, it will again return to the "redial standby" mode. If a different telephone number is dialed, the latching means opens immediately to prevent an unauthorized facsimile transmission.

The controller also accommodates facsimile machines having broadcasting or time delayed transmission capabilities. In broadcasting, the facsimile machine will sequentially send the same facsimile transmission to many different locations whereas in time delay transmission, the facsimile machine is programmed to send a facsimile message or messages at a time when the phone rates are cheaper, for example. The controller handles both of these modes with its broadcast mode. By entering a special user assigned password, the controller is placed in the broadcast mode which maintains the latching means (i.e. the telephone line) closed. An account and optional department number are entered and any number of facsimile messages can be sent at any time, all of which will be charged to the account number initiating the broadcast mode. The broadcast mode can also be initiated at a delayed time interval by setting a delay starting time.

Accumulated data may be displayed and/or printed. Account codes may be modified at any time by means of a built-in routine.

OBJECTS OF THE INVENTION AND BRIEF DESCRIPTION OF THE FIGURES

It is, therefore, one object of the present invention to provide a novel controller for facsimile/telephone systems for monitoring accountability of all telephone and facsimile transmissions and limiting access only to authorized personnel.

Another object of the present invention is to provide a novel controller for use with facsimile/telephone systems in which means are provided for differentiating between facsimile and non-facsimile/telephone transmissions.

Still another object of the present invention is to provide a novel controller for use in monitoring accountability for facsimile/telephone systems and in which the controller automatically recognizes and accommodates a redial mode.

Still another object of the present invention is to provide a novel controller for use in monitoring the accountability of a facsimile/telephone system in which the controller automatically recognizes and accommodates operation of the facsimile machine in the broadcasting, broadcasting time delayed, or time delayed transmission modes.

Still another object of the present invention is to provide a novel accountability controller for a facsimile/telephone system in which access codes can be modified and stored data may be displayed in a variety of different formats.

The above as well as other objects of the present invention will become apparent when reading the accompanying description and drawings in which:

FIGS. 1a and 1b, taken together, show the interface circuitry between the telephone line and the facsimile machine.

FIGS. 2a and 2b, taken together, show the controller system utilized for monitoring and controlling the interface circuitry of FIG. 1 and further for logging and storing data related to facsimile and telephone usage.

DETAILED DESCRIPTION OF THE INVENTION

Figure 1A:
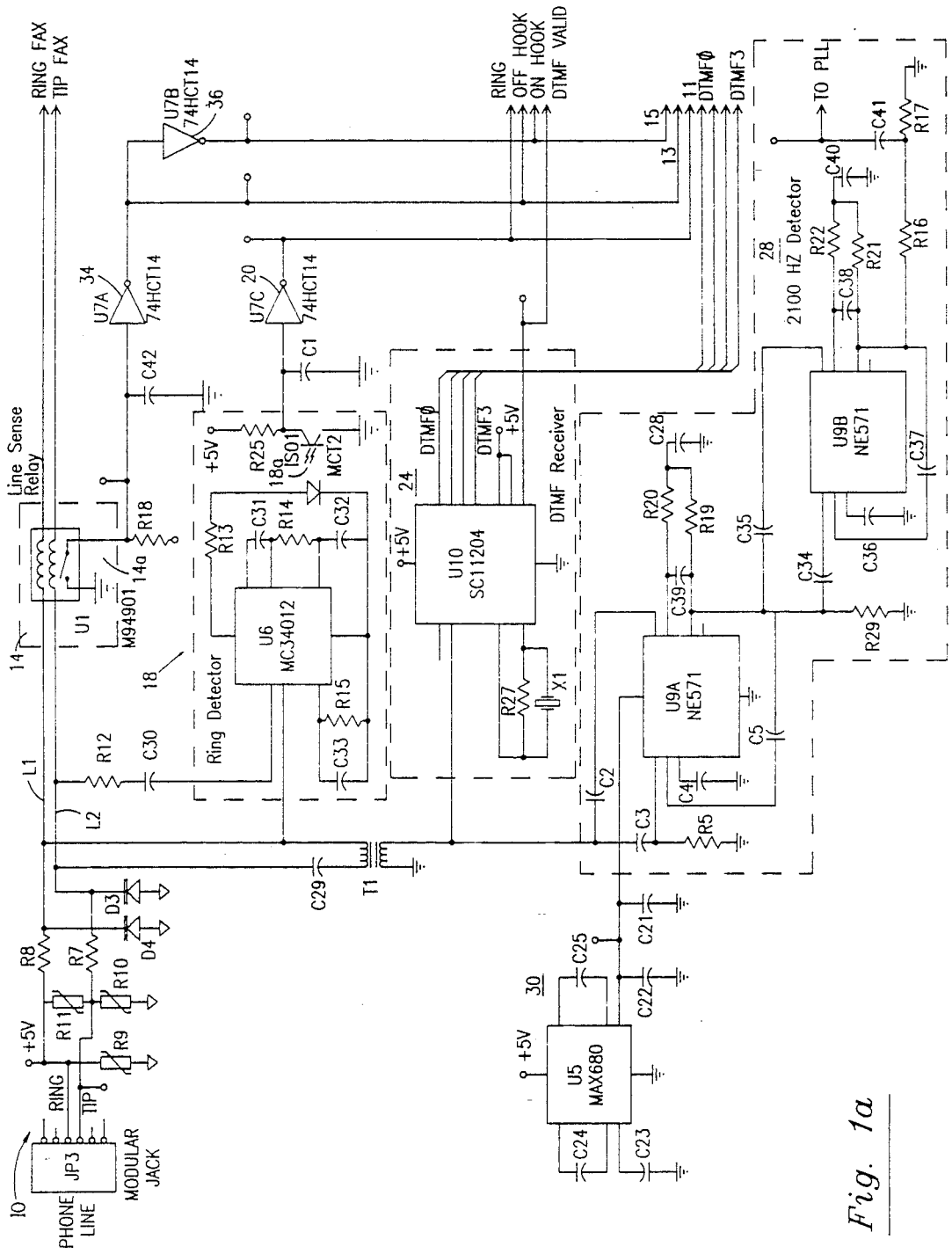
Figure 1B:
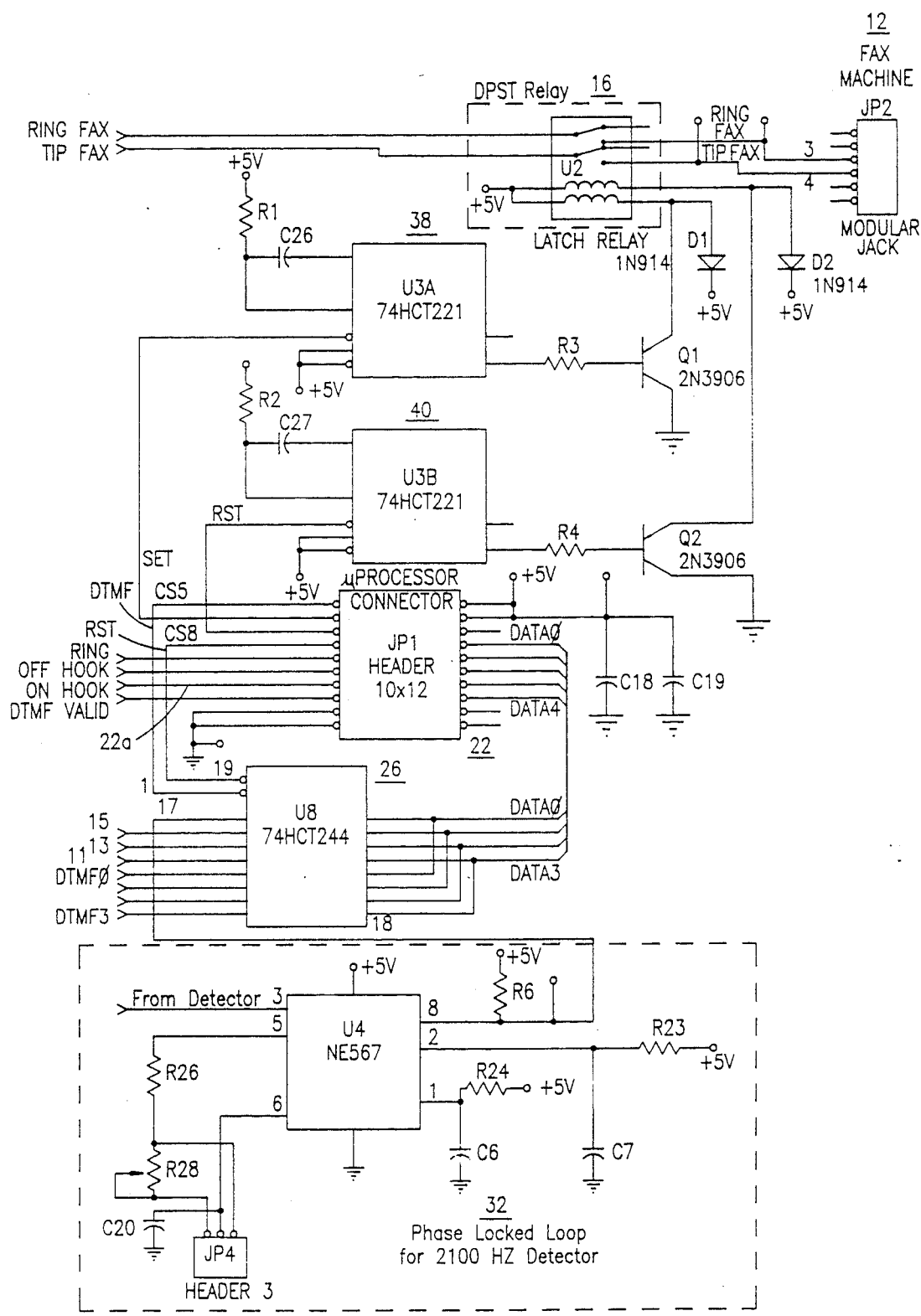

FIGS. 1a and 1b show a line sensing relay 14 and a double pole single throw latch relay 16 coupled between a telephone line 10 and a facsimile machine 12. Latch relay 16 is capable of maintaining either state to which it is driven (open or closed) when driven by a single pulse of short duration. A ring detector 18 is coupled across the pair of lines extending between the telephone line 10 and facsimile machine 12 and is provided with an opto-isolator 18a for coupling an output signal through circuit 20 to microprocessor connector 22. A tone receiver 24 is coupled across lines L1, L2 by transformer T and provides a four-bit binary output for transmission of each tone to the microprocessor by interface circuit 26 and connector 22. A 2100 Hz. detector circuit 28, coupled to power supply 30 monitors lines L1, L2 through isolation transformer T and couples its output to a phase locked loop 32 utilized by the 2100 Hz. detector. The output signal of the phase locked loop 32 is coupled to the interface circuit 26. The line sense relay 14 detects a pick-up condition and couples this condition to the microprocessor connector through amplifiers 34 and 36. Monostable multivibrator circuits 38 and 40 are coupled to the control windings of latch relay 16 by transistors Q1 and Q2, respectively.

Figure 2A:
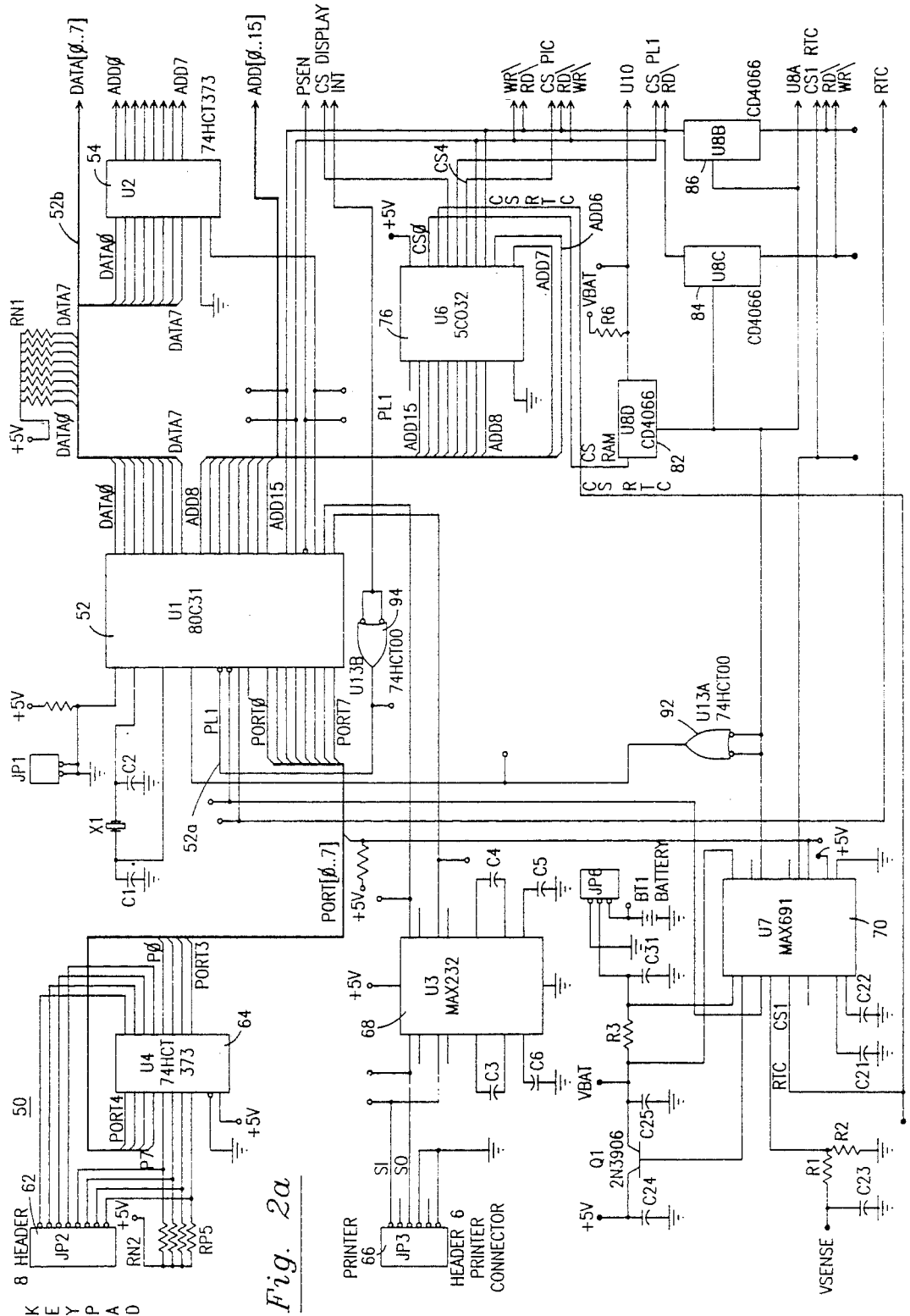
Figure 2B:
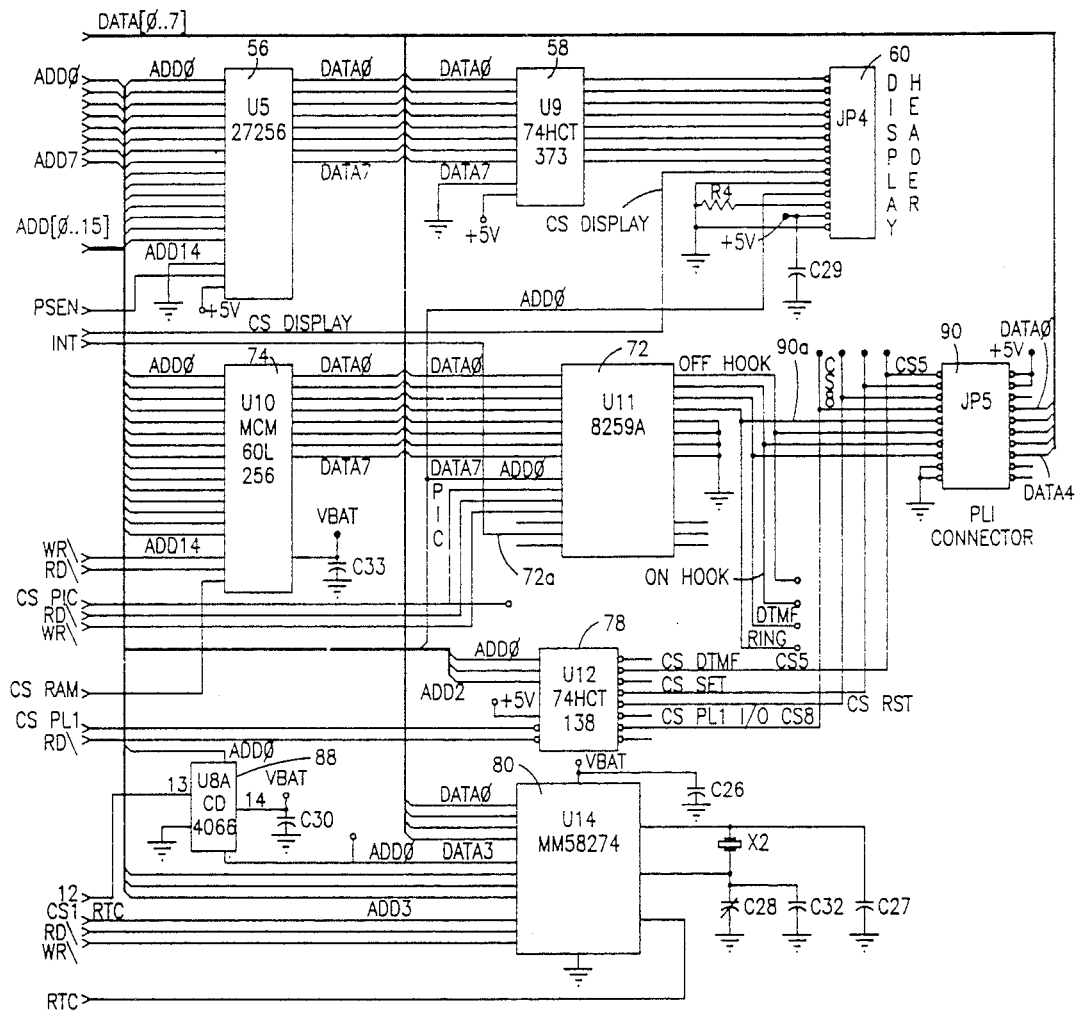

The controller 50, shown in FIGS. 2a and 2b, is comprised of microprocessor 52, latch circuit 54, EPROM 56, latch 58, display means 60, key pad 62, latch 64, printer 66, serial printer port 68, battery power supply controller 70, interrupt controller chip 72, random access memory (RAM) 74, address controller 76, address decoder 78, real time clock 80, analog switches 82, 84, 86 and 88, connector 90 and gates 92 and 94.

The CPU 52 controls the entire system including that shown in both FIGS. 1a, 1b and 2a, 2b. The operating programs are stored in EPROM 56.

To transmit a facsimile message, key pad 62 is operated. It should be understood that key pad 62 is a key pad having at least the keys "zero through nine" as well as some alphabetic and function keys, if desired. The key pad, which has eight output lines, transfers data in binary form to CPU 52 through latch 64. The operator number and optional department number are entered by key pad 62. CPU 52 compares the codes entered with those stored in RAM 74 and if the codes are valid, CPU 52 controls address decoder 78 to code the proper control and couple this control through connector 90 and the cooperating connector 22, shown in FIGS. 1a and 1b, to selectively operate the multivibrator circuits 38 and 40 causing latch relay 16 to close. The pulse applied to latch relay 16 is sufficient to cause the relay to become "latched" in the closed state. The facsimile machine 12 may now be operated to transmit a facsimile message. Operation of the facsimile machine 12 in the conventional manner ultimately causes the facsimile machine to pick up the line. This condition is sensed by line sense relay 14 which closes the relay contacts 14a applying a ground level signal through amplifiers 34 and 36 to the On-Hook line 22a coupled to connector 22. This condition is coupled to connector 90 of FIGS. 2a and 2b, the On-Hook line being transferred to interrupt controller circuit 72, whose interrupt line 72a is coupled to the interrupt input 52a of CPU 52 through gate 94. CPU 52 senses the interrupt condition and initiates a routine which starts an internal timer in the CPU.

As numbers are dialed by the facsimile machine, the receiver 24 detects each tone pair representative of a dialed number and converts each tone pair to a digital format. The digital information is transferred to interface circuit 26 which, in turn, transfers data to connector 90 through connector 22. Each of the numbers, in digital form, transferred to the controller 50 are stored in RAM 74.

When the facsimile machine being called answers, it generates a 2100 Hz. tone. The 2100 Hz. detector 28 detects the presence of the tone in lines L1, L2 and transfers this condition to the CPU through interface circuit 26 and connectors 22 and 90. One of the data lines of connector 90 is coupled to the CPU 52 through buffer 26 and data bus 52b. CPU 52 sets a facsimile flag, and records the account and department number in RAM 72. CPU 52 also extracts the date and time from real time clock 80 and transfers this information to RAM 74. In addition, CPU 52 resets the internal timer to zero at which time the internal timer again begins accumulating time, said time being displayed by display means 60.

When the facsimile communication is completed, the facsimile machine 12 drops the line. This condition is sensed by line sense relay 14 and conveyed to the controller in the manner described hereinabove, although the signal is now substantially at the five (5) volt level, and this condition initiates an interrupt causing CPU 52 to detect the dropped line causing the timer to stop. The accumulated time representing the duration of the facsimile message transmission is then recorded and the latch relay 16 is opened. The system is now ready for the next facsimile (or non-facsimile) transmission or reception.

When a remote facsimile machine attempts to transmit to facsimile machine 12, ring detector circuit 18 senses the presence of the ring voltage. This condition is transferred through the opto-isolator 18a and is coupled through amplifier 20 to the ring line of connector 22. This condition is coupled through connector 90 to the Ring line of interrupt controller circuit 72, causing CPU 52 to recognize the condition and transmit a Close control signal through connectors 90 and 22 to the multivibrator circuits 38 and 40 for closing latch relay 16. It should be noted that the bistable circuits are capable of generating a pulse of sufficient amplitude and duration to enable the relay to be latched in the closed state responsive to a level change from CPU 52.

Facsimile machine 12 picks up the telephone lines L1, L2 causing the line sense relay 14 to close and signalling CPU 52 in the manner previously described that the line is in use and that the latch relay 16 should be maintained closed.

When the incoming facsimile message is completed, facsimile machine 12 will drop the line causing line sense relay 14 to open. This condition is transferred to CPU 52 which causes the latch relay 16 to open, thereby preventing any facsimile messages from being transmitted by facsimile machine 12. For example, any attempt to transmit a facsimile message upon completion of a facsimile message received by facsimile machine 12, is prohibited. CPU 52, recognizing that a facsimile message is being received as opposed to being transmitted, does not log any data for the incoming facsimile message.

In the application where the facsimile machine 12 telephone is used to place a non-facsimile telephone call, it is nevertheless necessary to operate the key pad 62 in the same manner as was previously described in order to gain access to the facsimile/telephone equipment. In order to accommodate the non-facsimile telephone usage, a "default time" is set by the user as part of the controller program when the system is initially installed. The default time is selected to be slightly longer than the facsimile machine's "attempt time", i.e. the period for which the facsimile machine will continue to hold the line as long as there is no answering signal from the remote facsimile machine. When the line sense relay 14 detects that the telephone line 10 is picked up, the internal timer begins timing and the elapsed time is displayed by display means 60, which may be an LCD (liquid crystal display). However, if the elapsed time exceeds the "default time", the condition will be logged as a telephone call rather than as a transmission of a facsimile message even though a 2100 Hz. signal has not been detected. This technique prevents unauthorized calls to non-facsimile numbers and further assures that all telephone line usage is detected and properly logged.

In situations where a facsimile machine does not have a dedicated line, typically, the user must call the main number of the remote facsimile machine and be connected to an extension at which the remote facsimile machine is located. The time required for these connections will usually exceed the default time, causing the transaction to be logged as a telephone call. However, when the remote facsimile machine to receive the message answers with its 2100 Hz. tone, the non-facsimile telephone transmission flag set by CPU 52 is changed to reflect that a facsimile message is being transmitted rather than a non-facsimile telephone communication.

In instances where a facsimile message is desired to be transmitted and the remote facsimile machine is busy or is otherwise unavailable to answer (due to crowded telephone circuits or other possible conditions) the facsimile machine 12 will continue to establish a connection for the "attempt time" which is the period for which a facsimile machine will continue to hold the line if in an attempt to make a connection there is no answer at the other end. If the attempt time expires without making a connection, the facsimile machine enters into an automatic "redial" mode and will try to establish the connection again, typically after several minutes. As long as the controller default time has not been exceeded, i.e. as long as the default time has not expired before the attempt time, this condition is recognized by CPU 52 which also enters into the "redial standby" mode when the telephone line is released by facsimile machine 12. In this mode, CPU 52 retains the latch relay closed. If the same telephone number is dialed by the facsimile machine as was dialed prior to entering the "redial standby" mode, the call will be treated as a standard transmission and will be charged to the account number and department originally entered when the connection was initially attempted. If the facsimile transmission is completed, the CPU 52 returns to its standard "idle" mode. On the other hand, if the number dialed is again busy or there is no answer, the CPU 52 will again return to the "redial standby" mode, thus avoiding the need for reentry of the access code, thereby enabling the controller accountability operation to fully accommodate redialing applications. The latch relay 16 is opened if the redialed number is different from the original dialed number to prevent an unauthorized facsimile transmission.

When the facsimile machine 12 is in the broadcasting mode, the same facsimile message is sequentially transmitted to many different locations. In addition, the facsimile machine may also have the capability of a time delayed transmission wherein the facsimile machine 12 is programmed to send a facsimile message or messages at an hour when the telephone rates are cheaper, for example. Both of these operations are handled by providing the controller 50 with a broadcast mode. A special user assigned password is inserted into the controller through keyboard 62 causing the controller to maintain the latch relay 16 closed. Thereafter, an account and optional department number are entered and any number of facsimile messages can be sent at any time, all of which will be charged to that account number. The controller is returned to the standard mode by entry of a password upon completion of the broadcast or time delayed mode. CPU 52 thus charges the delayed facsimile message (in the case of time delayed transmissions) or the broadcast messages (in the case of the broadcast mode) wherein all of the charges are logged against the account and department numbers entered thus requiring the department and account numbers to be entered only once.

The programs entered into the EPROM 56 are set forth hereinbelow and include the power-up, restart, loop, exit, normal, broadcast and redial which programs are structured as follows:

KCFX FLOWCHART

POWER-UP:
reset fax relay.
delay.
initialize lcd display.
RESTART:
display "SELF TEST".
reset fax relay.
initialize hardware.
LOOP:
check ram checksums.
if no ram errors:
get time & date.
if time & date is greater than or equal to BROADCAST START then set BROADCAST FLAG.
display scrolling prompt.
if broadcast flag goto broadcast.
if key=255 then reset passwords.
if key pressed goto EXIT.
goto LOOP.

EXIT:
enter number.
if number is broadcast password then enter broadcast start time, stop time, account, and dept.
if number is maintenance password then goto maintenance.
if number is valid account goto NORMAL.
display "INVALID ACCOUNT".
if 3 invalid accounts disable unit for 1 minute.
goto LOOP.
NORMAL:
enter job#
BROADCAST:
wait for clear keyboard.
if invalid job display "INVALID JOB": goto RESTART.
if incoming call display "INCOMING CALL": goto RESTART.
enable fax relay.
REDIAL:
if log entries=maximum display "MAX LOGS": goto RESTART
if redialing display "WAIT FOR REDIAL": wait for off hook or "#" key.
if broadcast display "BROADCAST": wait for off hook or "#" key or time and date greater than or equal broadcast stop time.
display "PLEASE SEND FAX"
wait for off hook or "#" key.
wait for default time, fax tone, "#" key, or incoming fax, or on hook.

if key="#" or redial time up reset fax relay: goto RESTART.
if incoming fax and (redial or broadcast) goto REDIAL.
if incoming fax then reset fax relay: goto RESTART.
if redialing and different tele number reset fax relay: goto RESTART.
if on hook and not broadcast then set redial mode: goto REDIAL.
if fax tone then set fax tone flag.
if off hook set time, date, acnt, job, and tele number.
if not fax tone then set default time.
increment number of log entries.
wait for "#" key or on hook while displaying and counting time.
if broadcast goto REDIAL.
goto RESTART.

In the power-up mode, the facsimile relay 16 is reset and after a delay, the display is initialized.

During a restart program, the display is caused to generate a "SELF TEST" display. The facsimile machine relay 16 is reset and the system hardware is initialized.

During a LOOP mode, the CPU 52 determines the check sums of various sections of RAM 74 and checks the sums generated against a previously stored check sum for each such section of RAM. If no errors, the time and date is obtained from the real time clock 80. If the time and date is greater than or equal to the BROADCAST start time then the BROADCAST flag is set. Scrolling prompt is then displayed. If there is a BROADCAST flag, the program jumps to the BROADCAST subroutine. In order to reset the passwords, the code "255" is set in response to entry of an override password. If a key is depressed, the program jumps to the EXIT subroutine. If not, the program continues to loop through the LOOP subroutine.

In the EXIT subroutine, if the number entered through the key pad 62 is a BROADCAST password, the broadcast account, department and time and date data are entered into memory. If the number entered is a MAINTENANCE password, the programs jumps to the MAINTENANCE subroutine. If the number entered is valid, the program jumps to the NORMAL subroutine. In the event that the number is invalid, the legend "INVALID ACCOUNT" is displayed. If three invalid accounts are entered, the unit is disabled for one minute and then returns to the LOOP subroutine.

During the NORMAL subroutine, the job number is entered and the program jumps to the BROADCAST subroutine. When the keyboard is clear and the job number is invalid, the legend "INVALID JOB" is displayed and the system jumps to the RESTART subroutine. If the system detects an incoming call, the legend "INCOMING CALL" is displayed, and the system jumps to the RESTART subroutine. The facsimile relay 16 is enabled and the program jumps to the REDIAL subroutine.

If the log entries reach a maximum capacity, the legend "MAX LOGS" is displayed and the system jumps to the RESTART subroutine. If the system is redialing, the legend "WAIT FOR REDIAL" is displayed and the system waits for an off-hook or a "#" symbol key. If in the BROADCAST mode, the legend "BROADCAST" is displayed, the system either waits for an off-hook or a "#" key or the time and date to be equal or greater than BROADCAST start, the BROADCAST flag is set. This allows the BROADCAST mode to be started at a delayed time. For example, the BROADCAST mode could be set at 5:00 P.M. but to be initiated at 9:00 P.M. that evening (i.e. four hours after setting the BROADCAST mode) by setting a delayed start time. The system then displays the "PLEASE SEND FAX" legend and waits for either an off-hook or a "#" key. The system then waits for either a default time, fax tone, "#" key, an incoming fax or an on-hook condition. If the number key is depressed or the redial time times out, the facsimile relay 16 is reset and the system jumps to the RESTART subroutine. If an incoming facsimile is detected and the system is either in the REDIAL or BROADCAST mode, the system jumps to the REDIAL subroutine. If an incoming fax is detected, then the fax relay is reset and the system jumps to the RESTART subroutine.

If an incoming facsimile message is detected, the facsimile relay is reset and the system jumps to the RESTART subroutine. If the system is in the REDIAL mode and a different telephone number is detected, the fax relay is reset and the system jumps to the RESTART subroutine. If an on-hook condition is detected and the system is not in the BROADCAST mode, then the REDIAL mode is set and the system jumps to the REDIAL subroutine. Upon receipt of a fax tone (2100 Hz.) the fax tone flag is set. If the system is off hook, the time, data, account, job and telephone number are set into memory. If there is not a fax tone, then the default time is set. The system then increments the number of log entries and waits for operation of the "#" key or an on-hook condition while displaying and counting time. If the system is in the BROADCAST mode, then the program jumps to the REDIAL subroutine, the fax relay 16 is reset and the system jumps to the RESTART subroutine.

The system initial conditions and data stored therein may be accessed by the maintenance, print menu, account menu, department menu and display menu routines set forth hereinbelow:

MAINTENANCE:
display "MAINTENANCE MENU"
wait for key input.
if key=0 then calculate and display rom checksum as version.
if key=2 then enter and set broadcast password.
if key=3 then enter and set default time.
if key=4 then enter and set time and date.
if key=5 then enter and set location code.
if key=6 then enter master password. if correct enter and set passwords.
if key=7 then goto PRINTMENU.
if key=8 then enter and set timeout.
if key=9 then enter master password. if correct then initialize memory.
if key=A then goto ACNTMENU.
if key=B then enter and set fax cost.
if key=C then goto DISPLAYMENU.
if key=D then goto DEPTMENU.
if key=E then enter maint password. if correct erase all log entries.
if key=F then goto RESTART.
goto MAINTENANCE.

PRINTMENU:
if printer off line display "PRINTER ERROR": goto MAINTENANCE.
wait for key input.
if key=8 then print all reports.
if key=9 then print log entries in order made.
if key=A then print log entries in acnt order.
if key=B then print log entries in dept order.
if key=C then print log entries in tele number order.
if key=D then print acnt report. enter either all or acnt>0.
if key=E then print dept report. enter either all or dept>0.
if key=F then goto MAINTENANCE.
goto PRINTMENU.

ACNTMENU:
display "ACNT MENU"
wait for key input.
if key=D then enter accounts and disable until "#" key pressed alone.
if key=E then enter accounts and enable until "#" key pressed alone.
if key=F then goto MAINTENANCE. goto ACNTMENU.

DEPTMENU:
display "DEPT MENU".
wait for key input.
if key=D then enter depts and disable until "#" key pressed alone.
if key=E then enter depts and enable until "#" key pressed alone.
if key=F then goto MAINTENANCE.
goto DEPTMENU.

DISPLAYMENU:
display "DISPLAY MENU".
wait for key input.
if key=A then display acnts/time, scroll with D and E keys, exit "#" key.
if key=D then display depts time, scroll with D and E keys, exit "#" key.
if key=E then display log entries.
if key=F then goto MAINTENANCE.
goto DISPLAYMENU.

The MAINTENANCE menu is entered during the EXIT subroutine as was set forth hereinabove. When entered, the legend "MAINTENANCE MENU" is displayed, and the system waits for a key input. The different key inputs set forth provide for calculating and displaying the ROM checksum entering and setting the broadcast password, entering and setting the default time, entering and setting dates and time, entering and setting the location code and entering the master password and permitting the individual passwords to be set upon correct entry of the master password. The print menu (PRINTMENU), account menu (ACNTMENU), department menu (DEPTMENU) and display menu (DISPLAYMENU) are entered by respectively operating key 7, key A, key D and key C. The system will continue to loop in the MAINTENANCE subroutine until key F is operated.

Under the print menu routine, the data logged by the system may be printed out in a variety of different arrangements, as shown, according to the particular key selected when in the print menu routine.

Entering the account menu permits accounts to be either enabled or disabled depending upon the selected operating key.

Entering the department menu permits the department codes to be disabled or enabled upon operation of the appropriate key.

By entering the display menu, the operator, upon selection of the appropriate key, can display the accounts/time or the department/time in a scrolling manner or may display the log entries. Each of the aforementioned menus will loop continuously unless the "F" key is operated in order to return to the MAINTENANCE menu.

The system of the present invention may employ a variety of state-of-the art solid-state chips presently available in the marketplace. For example, the circuits of FIGS. 1 and 2 may employ solid-state chips whose model numbers and manufacturing sources are set forth hereinbelow (it being understood that a number of these model numbers are available from a variety of different manufacturing sources):

| FIGS. 1a and 1b | | |
| --- | --- | --- |
| Circuit Number | Chip/Part Number | Manufacturer |
| 52 | 80C31 | Intel |
| 54, 58 & 64 | 74HCT373 | Signetics |
| 56 | 27256 | Intel |
| 60 | DMC16128 | Optrex |
| 62 | EKYB-99003780 | Laube Technology |
| 66 | P-40S | Epson |
| 68 | MAX232 | Maxim |
| 70 | MAX691 | Maxim |
| 72 | 8259A | Intel |
| 74 | MCM60L256 | Motorola |
| 76 | 5CO32 | Intel |
| 78 | 74HCT138 | Signetics |
| 80 | MM58274 | National Semiconductor |
| 82-88 | CD4066 | Motorola |
| 92 & 94 | 74HCT00 | Signetics |
| 18 | MC34012 | Motorola |
| 20, 34 & 36 | 74HCT14 | Signetics |
| 24 | SC11204 | Sierra |
| 26 | 74HCT244 | Signetics |
| 28 | NE571 | Signetics |
| 30 | MAX680 | Maxim |
| 32 | NE567 | Signetics |
| 38 & 40 | 74HCT221 | Signetics |

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Apparatus for controlling a facsimile receiver/transmitter comprising:
 a telephone line;
 a facsimile receiver/transmitter for selectively receiving and transmitting facsimile messages;
 selective coupling means for directly coupling said facsimile receiver/transmitter to said telephone line when in a first state and for decoupling said facsimile receiver/transmitter from said telephone line when in a second state;
 means for receiving an access code;
 means directly connected to said selective coupling means and responsive to a valid access code for operating said selective coupling means to said first state for coupling the facsimile receiver/transmitter to said telephone line;
 means coupled between said telephone line and said facsimile receiver/transmitter for detecting and storing calling signals identifying the called facility as they are applied directly to said telephone line by the facsimile receiver/transmitter for coupling the facsimile receiver/transmitter to a called party;
 timer means being initiated responsive to a predetermined called party pick-up signal applied to the telephone line by the called facility;
 means responsive to a predetermined disconnect state generated by said facsimile receiver/transmitter for generating a terminate signal;
 first means responsive to said terminate signal for operating said selective coupling means to said second state for isolating said facsimile receiver/transmitter from said telephone line; and
 means for storing the time accumulated by said timer means responsive to said disconnect state, said storing means further including means for associating the accumulated time stored therein with the access code initiating the transmission and the called number associated therewith.

2. The apparatus of claim 1 wherein said housing includes means for generating real time and date information; and
 means for storing date and real time information responsive to said terminate signal.

3. The apparatus of claim 2 further comprising means directly coupled to said housing for printing the date, real time, elapsed time and called party number associated with the access code enabling the transmission.

4. The apparatus of claim 1 further comprising means responsive to said timer means reaching a predetermined default value before receipt of response code from the called station for storing the called party code together with a code identifying the transmission as a non-facsimile transmission.

5. The apparatus of claim 4 further comprising means responsive to storage of a non-facsimile code and the receipt of a response code for converting said stored non-facsimile code to a facsimile code.

6. The apparatus of claim 4 further comprising means responsive to a predetermined response code generated by the called facsimile receiver/transmitter for resetting said timer means.

7. The apparatus of claim 6 further comprising means for preventing storage of a non-facsimile code when said timer means is reset prior to reaching said default time value.

8. The apparatus of claim 1 further comprising means responsive to a predetermined response code generated by the called facsimile receiver/transmitter for resetting said timer means.

9. The apparatus of claim 8 further comprising means responsive to entry of a predetermined valid broadcast code for establishing a broadcast mode;
   means responsive to said broadcast mode for coupling said facsimile receiver/transmitter to said telephone line;
   means responsive to said broadcast mode for storing the broadcast code; and
   means responsive to each facsimile transmission during said broadcast mode for associating, in said memory means, each facsimile transmission with said broadcast code which initiated said broadcast mode.

10. The apparatus of claim 8 further comprising means for displaying time.

11. The apparatus of claim 8 further comprising means responsive to receipt of a response code for preventing the storage of a non-facsimile code.

12. The apparatus of claim 11 further comprising means responsive to a disconnect signal generated by said facsimile receiver/transmitter prior to said timer means reaching said default time for developing a stand-by state;
   means responsive to said stand-by state for maintaining said facsimile receiver/transmitter coupled to said telephone line.

13. The apparatus of claim 12 further comprising means for comparing the calling signals placed on the telephone line during a stand-by state with the previously stored calling signals; and
   means for associating the data stored for the present facsimile transmission with the previously stored access code responsive to a compare signal generated by said comparing means.

14. The apparatus of claim 12 further comprising means responsive to an acknowledge signal for terminating said stand-by state; and
   means responsive to termination of said stand-by state for isolating said facsimile receiver/transmitter from said telephone line.

15. The apparatus of claim 1 further comprising means responsive to a broadcast mode code for retaining the telephone line coupled to said facsimile transmitter/receiver;
   means responsive to completion of the each broadcast transmission of a facsimile message for associating the called location number and the elapsed time of the transmitted facsimile message with an account code entered with the broadcast mode request.

16. The apparatus of claim 1 further comprising means for displaying the time being accumulated by said timing means.

17. The apparatus of claim 1 further comprising means responsive to a maintenance request for establishing a maintenance mode condition;
   means for storing a printing program;
   keyboard means;
   means responsive to a predetermined entry through said keyboard means during a maintenance mode condition for selecting said printing program;
   means responsive to selection of said printing program for printing data stored in said memory means.

18. The apparatus of claim 1 further comprising means responsive to a maintenance request for establishing a maintenance mode condition;
   means for storing a displaying program;
   keyboard means;
   means responsive to a predetermined entry through said keyboard means during a maintenance mode condition for selecting said displaying program;
   means responsive to selection of said displaying program for printing data stored in said memory means.

19. The apparatus of claim 1 further comprising means responsive to a delayed transmission mode code for retaining the telephone line coupled to said facsimile receiver/transmitter;
   means responsive to completion of the each delayed transmission of a facsimile message for associating the called location number and the elapsed time of the transmitted facsimile message with an account code entered with the delayed transmission mode request.

20. The apparatus of claim 1 wherein said receiving means further includes means for receiving a department code; and
   said storing means further includes means for storing said department code so that said access code and department are associated with said elapsed time and called number stored in said storing means.

21. A method for controlling the operation of a facsimile transmitter/receiver associated with a telephone line comprising the steps of:
   receiving an access code at an input means of a controller;
   coupling said facsimile transmitter/receiver to said telephone line when the access code is determined to be valid;
   storing the access code;
   initiating a first elapsed time count when said facsimile transmitter/receiver applies a pick-up condition to the telephone line;
   determining the number being called applied to the telephone line by said facsimile transmitter/receiver;
   storing the called number;
   resetting the elapsed time count and starting a second elapsed time count upon receipt of an acknowledgement signal from the called facsimile transmitter/receiver; and
   storing the second elapsed time count when the calling facsimile transmitter/receiver terminates said pick up condition.

22. The method of claim 21 further comprising the steps of: storing a facsimile transmission state when an acknowledgement signal is received before the first elapsed time count reaches a predetermined count to identify the transmission as a facsimile transmission.

23. The method of claim 21 wherein the step of resetting the elapsed time count further comprises the step of storing a facsimile transmission state; and ignoring a subsequent access code at said input during the facsimile transmission state.

24. The method of claim 21 further comprising the steps of recording the second elapsed time count and access code together with the date and time of the transmission upon termination of the pick-up state.

25. The method of claim 24 further comprising the step of printing the data associated with a completed transmission.

26. The method of claim 21 further comprising the step of displaying the second elapsed time count.

27. The method of claim 26 further comprising the step of storing a non-facsimile transmission state when the first elapsed time count reaches a predetermined count in the absence of an acknowledge signal to identify the transmission as a non-facsimile telephone transmission.

28. The method of claim 27 further comprising the step of converting the stored non-facsimile transmission state responsive to receipt of an acknowledge signal subsequent to storage of a non-facsimile state to identify the transmission as a facsimile transmission.

29. A method employing a controller for selectively coupling a facsimile transmitter/receiver and an associated telephone line, said controller having code input means and selective coupling means for coupling said facsimile transmitter/receiver to said telephone line when in a first state and for decoupling said facsimile transmitter/receiver from said telephone line when in a second state, said method comprising the steps of:

normally maintaining said selective coupling means in said second state;

detecting the application of a valid access code at said code input means for creating a broadcast state;

storing the access code in a memory;

operating said selective coupling means to said first state for coupling the facsimile transmitter/receiver to the telephone line responsive to the valid access code; and associating any completed facsimile transmission, including the identity of the called party and the length of the completed facsimile transmission, with said access code when in said broadcast state.

30. The method of claim 29 wherein said controller includes a real time clock, said method further comprising the steps of storing a starting time for delayed initiation of the broadcast mode; and initiating the broadcast mode when the stored starting time is at least equal to the real time.

31. The method of claim 29 wherein said controller includes a real time clock, said method further comprising the steps of storing a starting time and termination time for delayed initiation of the broadcast mode; and initiating the broadcast mode when the stored starting time is at least equal to the real time and terminating said broadcast mode when the terminating time is at least equal to the real time.

32. The method of claim 29 wherein the step of coupling the facsimile transmitter/receiver to said telephone line further comprises the step of maintaining said coupling to await the occurrence of a facsimile transmission which is delayed for a significant interval after establishing said broadcast state.

33. The method of claim 32 further comprising detecting and storing the delayed generation of a calling code by said facsimile transmitter/receiver;

initiating an elapsed time count upon receipt of an acknowledgement code from the called facsimile transmitter/receiver;

terminating said count upon receipt of a facsimile termination signal from said facsimile transmitter/receiver;

storing said count; and associating said stored count with the access code which established the broadcast state.

34. The method of claim 32 further comprising the steps of maintaining said facsimile transmitter/receiver coupled to said telephone line while it performs a plurality of facsimile transmissions to different called facsimile transmitter/receivers, each transmission comprising the steps of:

receiving and storing a first calling code generated by said facsimile transmitter/receiver;

initiating an elapsed time count upon receipt of an acknowledgement code from the called facsimile transmitter/receiver;

terminating the elapsed count upon receipt of a facsimile termination signal from said facsimile transmitter/receiver;

each of said elapsed counts being paired with its calling code; and associating all of said pairs of data with the access code which initiated the broadcast state.

35. The method of claim 34 further comprising the step of storing a real-time and date of each facsimile transmission and associating the real-time and date of each facsimile transmission with the access code which initiated the broadcast state.

36. A method for controlling a facsimile transmitter comprising the steps of:

receiving an access code;

coupling the facsimile transmitter to a telephone line responsive to a valid access code;

initiating a timer when pick-up of the line by the facsimile transmitter is sensed;

identifying the transmission as a facsimile transmission when a predetermined tone frequency is received from the called party coupled to the telephone line.

37. The method of claim 36 further comprising the step of identifying the transmission of a non-facsimile telephone transmission when a predetermined tone frequency is not received within a predetermined time after initiation of said timer.

38. The method of claim 37 wherein said predetermined time is greater than the "attempt" time the facsimile transmitter employs to attempt to connect a called party before dropping the telephone line.

39. The method of claim 38 further comprising the step of altering the transmission as a facsimile transmission if the predetermined tone frequency is received after termination of the attempt time.

40. A method for controlling a telephone line and a facsimile transmitter/receiver including means for sequentially transmitting facsimile messages to a plurality of remote locations when in a broadcast mode, comprising the steps of:

(a) coupling the facsimile transmitter/receiver to the telephone line to initiate a broadcast mode;

(b) storing an account code for allocating the facsimile messages to be transmitted;

(c) detecting the number of the called locations placed on the telephone line by the facsimile transmitter/receiver;

(d) counting the time elapsed responsive to an answering tone placed on the line by the called locations;

(e) associating the called number and elapsed time of the transmitted message with the account code responsive to the dropping of the line by the facsimile transmitter/receiver; and (f) repeating steps (c) through (e) responsive to each facsimile message transmitted by the facsimile transmitter/receiver during the broadcast mode.

41. A method for controlling a telephone line and a facsimile transmitter/receiver including means for transmitting a facsimile message to a remote location a predetermined delay interval after a delayed transmission request, comprising the steps of:

(a) coupling the facsimile transmitter/receiver to the telephone line to initiate a delayed transmission mode:

(b) storing an account code for allocating the facsimile messages to be transmitted;

(c) detecting the number of the called locations placed on the telephone line by the facsimile transmitter/receiver;

(d) counting the time elapsed responsive to an answering tone placed on the line by the called locations;

(e) associating the called number and elapsed time of the transmitted message with the account code responsive to the dropping of the line by the facsimile transmitter/receiver; and (f) repeating steps (c) through (e) responsive to each facsimile message transmitted by the facsimile transmitter/receiver during the delay transmission mode.

42. Apparatus for controlling a facsimile machine comprising:

a telephone line;

latching relay means for selectively coupling the facsimile machine to the telephone line;

means for closing said latching relay responsive to a valid access code;

a line sensing means responsive to pick-up of said telephone line by said facsimile machine for initiating a timing means;

memory means;

means responsive to the presence of signals in said telephone line identifying a called location for storing said signals in said memory means;

means responsive to a predetermined elapsed time period accumulated by said timing means for storing a first flag condition identifying the transmission to the called location as a non-facsimile telephone transmission when no acknowledgement signal is received from the called location during said elapsed time period.

43. The apparatus of claim 42 further comprising means for altering said first flag condition to a second flag condition identifying a facsimile transmission responsive to a sensing tone frequency in said telephone line subsequent to storage of said first flag condition.

44. The apparatus of claim 42 further comprising means for initially setting a second flag condition identifying a facsimile message transmission responsive to application of a predetermined tone frequency to said telephone line by the called station prior to said timing means accumulating said predetermined elapsed time period.

45. The apparatus of claim 42 further comprising means for storing a receiving mode condition responsive to a ring signal applied to said telephone line;

receiving control means responsive to said receiving mode condition for closing said latching relay means; and said receiving control means further comprising means responsive to said receiving mode condition for preventing transmission of a facsimile message from the calling facsimile machine.

46. The apparatus of claim 42 further comprising means responsive to a drop-out of the telephone line by said facsimile machine for creating a standby mode condition;

means responsive to a redialing of a called number during a standby mode condition for associating the redialed number with the initially sensed access code.

47. The apparatus of claim 46 further comprising means for enabling association of said access code with the initially called number when said initially called number and the redial number are the same.

48. The apparatus of claim 46 further comprising means comparing the redialed number with the originally dialed number for generating a latch release signal when said compared numbers are not the same; and said latch means being opened responsive to said latch release signal.

49. A method of operating a controller for selectively coupling a first facsimile transmitter/receiver and an associated telephone line, including means for selectively directly coupling the fist facsimile transmitter/receiver to the telephone line when in a first state and for decoupling the first facsimile transmitter/receiver from said telephone line when in a second state, comprising the steps of:

normally maintaining said selective coupling means in said second state;

operating said selective coupling means to said first state for coupling said first facsimile transmitter/receiver to said telephone line upon receipt of a ringing signal applied to said telephone line from a remote facsimile transmitter/receiver which has placed a call to and has been coupled to said telephone line;

establishing a receiving state upon detection of a pick-up signal from the first facsimile transmitter/receiver which is generated responsive to said ringing signal;

maintaining said receiving state throughout transmission from the remote facsimile transmitter/receiver to the first facsimile transmitter/receiver; and immediately decoupling said first facsimile transmitter/receiver from said telephone line when said pick-up signal is released to prevent a facsimile transmission unless a valid access code is subsequently applied to the controller.

50. The method of claim 49 wherein the controller has an input for receiving an access code and further comprising the step of ignoring an access code applied to said input during a receive state.

51. The method of claim 49 wherein the controller has means for receiving an access code and further comprising the steps of:

coupling said facsimile transmitter/receiver to said telephone line when a valid access code is received and in the absence of a receive state;
initiating a first transmission elapsed time count when said facsimile transmitter/receiver generates a pick up signal;
storing the calling code applied to the telephone line;
terminating the first transmission elapsed time count upon detection of an acknowledge signal generated by the called facsimile transmitter/receiver identified by said calling code and initiating a second transmission elapsed time count; and
storing the second transmission elapsed time count upon termination of the pick up signal by the facsimile transmitter/receiver initiating the call.

* * * * *